P. E. DAUBENSPECK.
BALING PRESS.
APPLICATION FILED JAN. 28, 1911.

1,002,651.

Patented Sept. 5, 1911.

WITNESSES

INVENTOR

UNITED STATES PATENT OFFICE.

PETER E. DAUBENSPECK, OF MARIETTA, OHIO, ASSIGNOR TO PARKERSBURG STEEL BALER COMPANY, OF PARKERSBURG, WEST VIRGINIA, A CORPORATION OF WEST VIRGINIA.

BALING-PRESS.

1,002,651.  Specification of Letters Patent.  Patented Sept. 5, 1911.

Application filed January 28, 1911. Serial No. 605,193.

*To all whom it may concern:*

Be it known that I, PETER E. DAUBENSPECK, a resident of Marietta, in the county of Washington and State of Ohio, have invented certain new and useful Improvements in Baling-Presses, of which the following is a specification.

This invention relates to a press which is designed especially for baling waste-paper and like material, the primary object being to provide a simple yet powerful machine of compact construction which is adapted to be operated in basements, cellars and other places having restricted head room.

The invention is embodied in improved mechanism for depressing and retracting the plunger, and for moving the plunger out of the way when retracted.

The invention is further directed to novel structural features in the bale box as well as the plunger.

Figure 1:
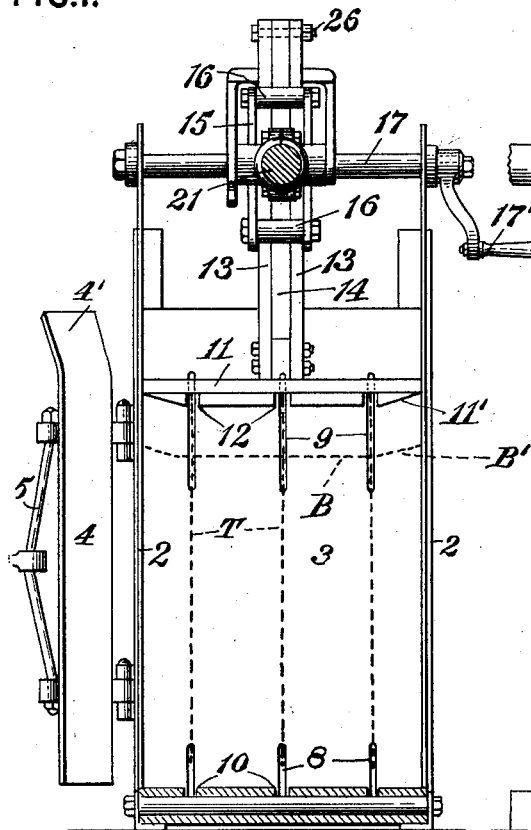
Figure 2:
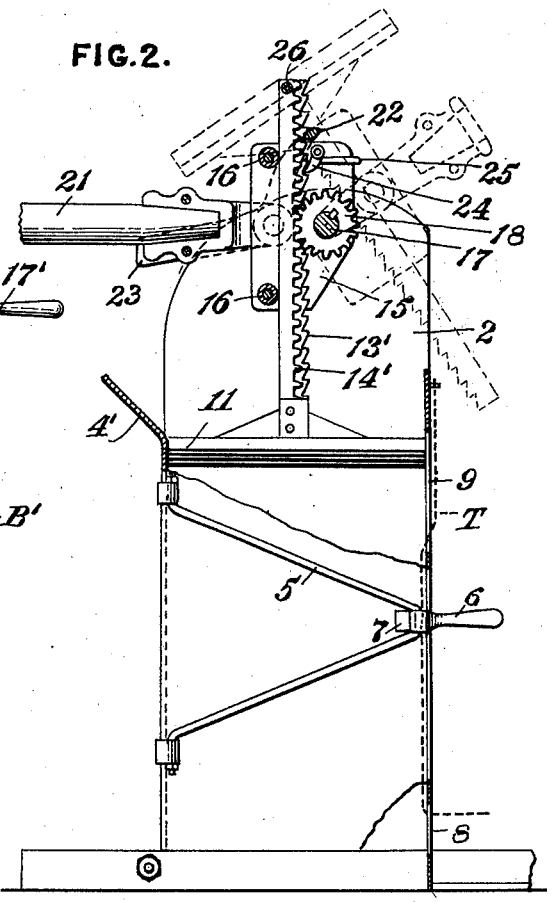
Figure 3:
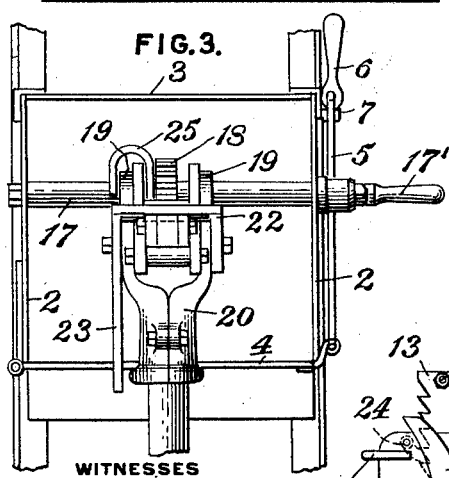
Figure 4:
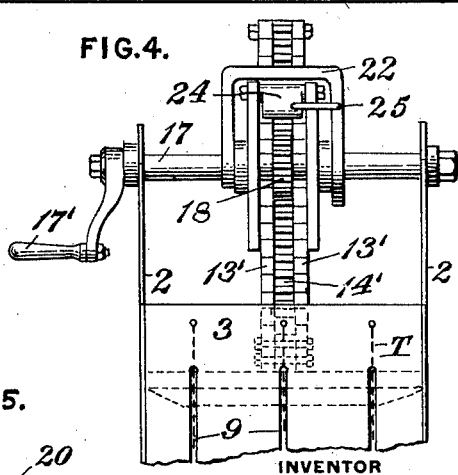

In the accompanying drawings, Figure 1 is a front elevation of the improved press, showing the hinged side thereof open, and Fig. 2 is a side elevation thereof, partly in section. Fig. 3 is a top plan. Fig. 4 is a rear elevation of the plunger operating mechanism. Fig. 5 is a detail of the ratchet mechanism.

Referring to the drawings, the bale box consists of opposite side walls 2, rear wall 3 and front wall 4, the latter hinged and forming a door, with its upper end flared outwardly at 4' to facilitate filling waste-paper or other matter into the box. The door may be held closed by loop 5 carried by its free edge, with the cam-handle 6 of the loop engaging a stop 7 projecting from one of walls 2. At the base of rear wall 3 are slots 8 for inserting the lower portions of wire or other bale ties T, the upper portions of such ties passing outwardly through slots 9, as in Fig. 2, the ties being thus located during the pressing operation with the bottom of the box grooved horizontally at 10, and plunger 11 similarly grooved at 12 for projecting the ties around the top and bottom ends of the bale, as is usual in baling presses. It will be understood that after the bale has been pressed, door 2 is opened so that the ties may be secured. While the bale box may be constructed in any desired manner, the walls thereof are preferably formed of metal plates.

Projecting from the center of plunger 11 are the two separated ratchet bars 13 which are on opposite sides of the central rack bar 14. The ratchet teeth 13' are removed laterally or out of the plane of gear teeth 14' of rack bar 14, so that the ratchet mechanism, presently to be described, does not engage nor interfere with the rack bar. The bars 13 and 14 extend upwardly through a frame which consists of the vertical separated plates 15, connected by the transverse spacers 16, this frame being rotatably supported on the transverse shaft 17, journaled in the upper ends of box walls 2, and provided with crank handles 17'. The bars 13 and 14 are adapted to move along the inner surfaces of two of the spacers 16, and are thus guided in their vertical movement and at the same time held in operative relation with the operating mechanisms, bar 14 being maintained in mesh with gear wheel 18 on shaft 17, and the ratchet bars being held in proper position for the ratchet mechanism. Frame 15 is embraced by arms 19 of bifurcated lever 20, the latter being in the form of a socket for receiving the removable operating bar 21. Arms 19 are loosely mounted on shaft 17, the latter thus forming the lever fulcrum. Pivoted at 20 to the bifurcated portion of the lever, forwardly from shaft 17, is the bail-shaped ratchet or pawl 22, having one end thereof projected outwardly alongside of lever 20 to form handle 23, the latter also serving as a counterweight to hold pawl 22 normally in engagement with ratchet teeth 13' of bar 13, as shown in Figs. 2 and 4, said teeth being disposed upwardly as shown. Pivoted to frame 15 is dog 24 for holding the ratchet bars from upward movement while pawl 22 is being operated to secure a fresh hold. Dog 24 depends from its pivot as shown, and projecting backwardly from the dog and around one of plates 15 and one of arms 19 is the curved arm 25, which extends into the path of one of the side portions and the pawl 22, so that when the latter is moved out of engagement with teeth 13' upon the raising of handle 23, it strikes arm 25 and throws dog 24 out of engagement with the ratchet bars, as will be seen upon reference to Fig. 5.

The operation is as follows: The material to be baled having been placed in the bale box, the plunger is lowered by the step-by-step ratchet movement resulting from the vertical oscillations of operating bar 21, the racks being prevented from lowering too far by cross bolt 26 carried thereby engaging frame sides 15, which prevents further downward movement. During this operation shaft 17 is turned idly by the downward movement of rack bar 14. When the bale has been sufficiently compressed, door 4 is opened and the bale is wired as above described, and then the plunger is retracted by rotating shaft 17, pawl 22 being then held by the raising of handle 23 so that it will not engage the ratchet bars, and this movement of the pawl similarly disengaging dog 24 as before described. When the plunger is raised far enough to engage the lower extremities of frame sides 15, further rotation of the shaft causes said frame, together with the plunger and the ratchet mechanism, to turn on the shaft into the position indicated by dotted lines in Fig. 2, with the plunger completely removed from the bale box and quite out of the way so that the latter may be again filled without hindrance. With the operating bar 21 removed from its socket, this manipulation of the plunger is accomplished with very little more head room than is necessary for accommodating the press, so that the latter may be conveniently operated in paper vaults, cellars or basements having low ceilings.

It is necessary to fill the bale box with loose material several times and press down each filling before enough material is had to form a full bale. To retard the uplift or expansion of the compressed material the pressing face of plunger 11 is sloped upwardly near its edges, as indicated at 11', which forms the top surface of the compressed pile with corresponding upwardly sloping edge portions which tend to wedge against the box walls and retard the upward expansion when the pressure of the plunger is removed. In Fig. 1 the dotted line B indicates the top surface of a partially formed bale, and portions B' the sloping formation imparted by the plunger to which I refer.

I claim:—

1. The combination of a bale box, a shaft journaled transversely in the upper portion of the box, a plunger, plunger depressing means carried by the shaft, and plunger elevating means—separate from the depressing means—carried and operated by said shaft.

2. A plunger for a bale press having its pressing face receding upwardly adjacent its edges, for the purpose described.

3. The combination of a bale box, a plunger, a rack projecting from the plunger, a shaft disposed transversely of the bale box, a ratchet carrier mounted to oscillate on the shaft, a ratchet pivoted to the carrier and coöperating with the rack for depressing the plunger, and gear means actuated by said shaft for retracting the plunger.

4. The combination of a bale box, a plunger, a frame mounted to oscillate on a horizontal axis, mechanism movable with the frame for depressing the plunger, and means for turning the frame on its axis for moving the retracted plunger out of pressing position.

5. The combination of a bale box, a plunger, bars projecting from the plunger carrying ratchet teeth and gear teeth, a plunger depressing ratchet coöperating with the ratchet teeth, and a plunger retracting gear coöperating with said gear teeth.

6. The combination of a bale box, a plunger, a rotatable shaft arranged transversely of the bale box, bars projecting from the plunger provided with ratchet teeth and gear teeth, ratchet mechanism mounted to oscillate on the shaft for coöperating with said ratchet teeth for depressing the plunger, and a gear wheel on the shaft and engaging said gear teeth for retracting the plunger.

7. The combination of a bale box, a plunger, a rotatable shaft arranged transversely of the bale box, a frame mounted to oscillate on the shaft and forming a vertical guide, means projecting from the plunger and movable in and guided by said frame and provided with ratchet teeth and gear teeth, ratchet mechanism mounted to oscillate on said shaft and coöperating with said ratchet teeth for depressing the plunger, and a gear wheel on the shaft coöperating with said gear teeth for retracting the plunger and for turning said frame together with the retracted plunger out of pressing position.

8. The combination of a bale box, a plunger, a ratchet bar projecting from the plunger, a vertically oscillating lever, a ratchet pivoted to the lever and coöperating with the ratchet bar for depressing the plunger, a holding dog for the ratchet bar, and means operated by the ratchet for releasing said dog.

9. The combination of a bale box, a plunger, a ratchet bar projecting from the plunger, a rotatable shaft disposed transversely of the bale box, a guide for the ratchet bar mounted to oscillate on said shaft, oscillating ratchet mechanism coöperating with the ratchet bar for depressing the plunger, a holding dog pivoted to the frame for engaging the ratchet bar, means actuated by the ratchet mechanism for releasing the dog, and gearing actuated by the shaft for retracting the plunger and for turning the frame and retracted plunger for placing the latter out of pressing position.

10. A plunger for a bale press having its pressing face adjacent its edges sloping away from the direction in which the plunger moves for pressing, for the purpose described.

11. The combination of a bale box having wire passages in one side near its bottom and vertical slots for the wire upwardly from said wire passages, the box having a side wall adapted to open, a plunger, and plunger operating means.

12. The combination of a bale box, a plunger, a ratchet bar projecting from the plunger, an operating lever, a ratchet pivoted to the lever and normally engaging the ratchet bar, and a handle projecting from the ratchet in a direction away from the ratchet bar.

In testimony whereof I affix my signature in presence of two witnesses.

PETER E. DAUBENSPECK.

Witnesses:
S. B. DIXON,
J. N. WOOLEY.